United States Patent
Campbell

[11] 3,813,599
[45] May 28, 1974

[54] BANDWIDTH MEASUREMENT SYSTEM
[75] Inventor: Kenneth J. Campbell, Solana Beach, Calif.
[73] Assignee: The United States of America as represented by the Secretary of the Navy, Washington, D.C.
[22] Filed: June 4, 1973
[21] Appl. No.: 366,805

[52] U.S. Cl. ................................. 325/67, 325/363
[51] Int. Cl. ............................................. H04b 1/00
[58] Field of Search ...... 307/319, 233; 325/67, 363; 324/77 B, 57 R, 78 R; 330/2

[56] References Cited
UNITED STATES PATENTS

| | | | |
|---|---|---|---|
| 2,165,799 | 7/1939 | Kimball et al. | 330/2 |
| 3,227,949 | 1/1966 | Oberbeck | 324/57 R |
| 3,699,434 | 12/1972 | Palmer | 324/57 R |
| 3,783,388 | 1/1974 | Disinger | 325/363 |

FOREIGN PATENTS OR APPLICATIONS

| | | | |
|---|---|---|---|
| 919,222 | 1963 | Great Britain | 325/363 |

Primary Examiner—Robert L. Griffin
Assistant Examiner—Jin F. Ng
Attorney, Agent, or Firm—R. S. Sciascia; G. J. Rubens; J. W. McLaren

[57] ABSTRACT

A signal source producing signals of selectively determinable variations in repetition frequency drives a step-recovery diode circuit for generating signals having spectral frequency distributions varying in response to changes in the repetition frequency. The spectrally distributed signals are impressed upon the circuit under test and a wide band amplitude modulation detector is connected to the output of the circuit under test. As the pulse repetition frequency is gradually changed, the output of the detector is observed, and the highest pulse repetition frequency producing signals detectable by the detector is a measure of the bandwidth of the circuit under test.

4 Claims, 5 Drawing Figures

BANDWIDTH MEASUREMENT SYSTEM

BACKGROUND OF THE INVENTION

It is often necessary or desirable to determine the limitations of the bandwidth of frequency response characteristics of a particular electronic equipment such as an entire receiver, for example, the RF portions of a receiver, the IF portions of an equipment, etc. One method and means frequently employed in the prior art to determine the bandwidth of an equipment is to employ a sweep oscillator for developing signals at the input to the equipment under test while observing the output from the equipment under test on an oscilloscope. Though this method and means is quite acceptable insofar as its accuracy and reliability are concerned, it has the disadvantage of inherently involving the use of sizeable, relatively expensive, test equipments including a sweep oscillator signal generator and an oscilloscope, as well as requiring considerable time and care in execution of the procedure.

Other prior art systems have been devised including the use of a variable frequency oscillator as a signal source driven by a ramp generator to impress signals varying in frequency upon the equipment under test. Signals may then be developed which indicate the upper bandwidth limit and lower bandwidth limit of the circuit under test. From such signals indicative of the upper and lower limits, the center frequency of the response of the device under test may be determined, as well as its bandwidth.

Other types of prior art frequency response analyzers employed variant techniques, many of which were quite complicated and complex involving correlation operations, multiplication, and integration, etc. for determining frequency response characteristics of electronic equipments.

Though many such prior art systems were satisfactory to achieve their design objectives, they nonetheless suffered the disadvantages of involving large, relatively cumbersome, expensive, and complicated test equipment.

Accordingly, it is desirable that a bandwidth measurement system to be devised which is simple, effective to achieve its purpose, relatively inexpensive, compact, and thoroughly reliable as well.

Additionally, it is desirable that such a bandwidth measurement system be highly versatile in the sense of being readily adaptable to use with a broad variety of equipments or selected portions of equipments for the determination of their bandwidth response.

SUMMARY OF THE INVENTION

The concept of the present invention includes a signal source which may take the form of a variable oscillator, for example, for producing signals of selectively determinable variation in repetition frequency. A step-recovery diode circuit is provided to receive the signals from the aforementioned source and is responsive to such signals for generating output signals having spectral frequency distributions varying as a function of the variations in repetition frequency. That is to say, the step-recovery diode circuit produces a "comb spectrum" output which consists of harmonics of the repetition frequency of the signal received by the step-diode circuit, and wherein the spectral spacing between adjacent harmonics is equal to the fundamental frequency.

The output signals of the step-recovery diode circuit, which are harmonically distributed relative to frequency, are impressed upon the input of the circuit or equipment under test. A wide band amplitude modulation detection means (which may in some cases take the form of the amplitude modulation detection portions of a receiver under test, for example) is connected to the output of the circuit under test.

The initial repetition frequency of the signal source is chosen at a relatively low frequency to insure that the amplitude modulation detector produces an output, such as would be generated by the reception of a modulated carrier signal. As the repetition frequency of the signal source is increased, a frequency will be reached where the wide band amplitude modulation detector will cease to generate an output and that repetition frequency indicates the bandwidth limitations of the equipment under test.

The concept of the present invention conceives the generation of a harmonic-rich signal comprising multiples of a variable fundamental frequency. As the fundamental frequency is increased, the harmonic frequencies are commensurately separated from each other by greater frequency intervals relative to their spectral distribution. Further, within the concept of the present invention, when such signals are impressed upon the input of an equipment under test, they will appear as, and be detected as, amplitude modulations by such equipment.

Moreover, within the inherent contemplation of the present invention, when any two adjacent harmonics of the signals impressed upon the input of an equipment under test are not passed to its output for detection, the limit of the bandwidth response of the equipment has been effectively determined and established. Such determination derives from the fact that the spectral separation of adjacent harmonics must be equal to the frequency of the repetitive signal employed to develop the harmonic-rich signals and therefore the bandwidth response of the equipment under test is essentially equal to the fundamental frequency at which detection of output signals ceases to appear at the output of the equipment under test.

The concept of the present invention is such that the bandwidth measurement system may be embodied in relatively simple, highly compact, and extremely durable form. Very simple step-recovery diode circuits adaptable for use as conceived by the present invention may be designed using a minimum of inexpensive, high reliability, solid state devices.

Moreover, the bandwidth measurement system of the present invention may be employed to determine the overall bandwidth response of an entire receiver or, as desired, to include only the RF portions, or the IF portions, for example, of a receiver of similar equipment.

Accordingly, it is a primary object of the present invention to provide a bandwidth measurement system which, as contrasted to prior art systems having comparable operative objectives, is relatively simple in concept, implementation, and use.

Another most important object of the present invention is to provide such a bandwidth measurement system which may be readily implemented in solid state embodiments to enhance its reliability and durability.

A further object of the present invention is to provide such a bandwidth measurement system which, because of its simplicity in concept and implementation, requires minimal subjective judgments and determinations in use.

Yet another most important object of the present invention is to provide a bandwidth measurement system which obviates the need for special tuning of the signals applied to equipments for test purposes.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
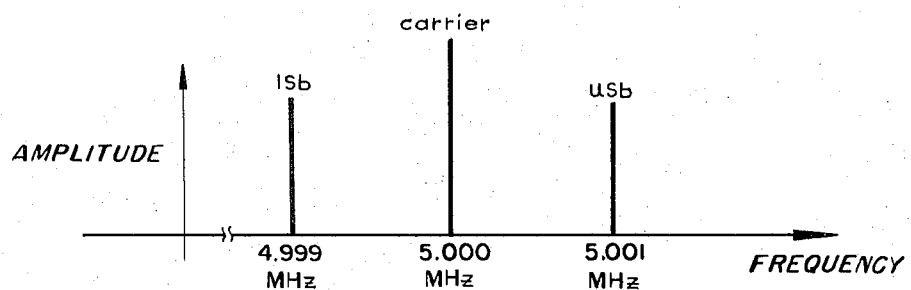
FIG. 1 is a graphical illustration of a carrier signal, a lower sideband signal, and an upper sideband signal as they may be disposed relative to frequency.

It can be shown by spectrum analysis, for example, that when a first signal, which may be referred to as the carrier frequency signal, is amplitude modulated by a second signal, third and fourth signals are produced known as the upper and lower sideband frequencies. The sideband frequencies are also known as the sum and difference frequencies and may be determined as follows:

$F_{usb} = F_{carrier} + F_{mod}$ and
$F_{lsb} = F_{carrier} - F_{mod}$

Where $F_{usb}$ = frequency of the upper sideband
$F_{lsb}$ = frequency of the lower sideband
$F_{carrier}$ = frequency of the carrier
$F_{mod}$ = modulation frequency For example, if a 5MHz signal is amplitude modulated by a 1KHz sine wave the resultant lower and upper sideband frequencies would be 4.999MHz and 5.001MHz, respectively. A graphical representation of these relationships is shown in FIG. 1 which illustrates the frequency distribution of such carrier and sideband signals as well as typical amplitude relationships.

Figure 2:
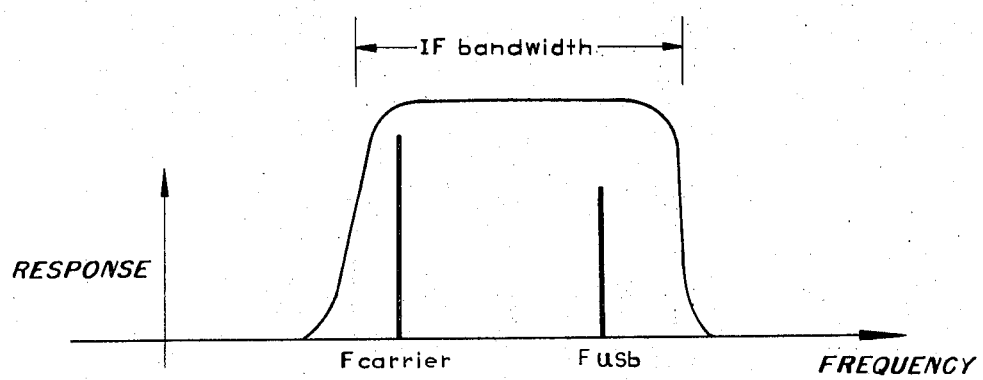
FIG. 2 is a graphical illustration of a carrier signal and an upper sideband signal as they may be disposed relative to frequency within the IF bandwidth of an equipment.

It is also well known that a suitable detector can recover amplitude modulation of both the carrier frequency and either one of the lower or upper sideband are present. Thus, if the modulation frequency is less than the bandwidth of an IF amplifier in a particular receiver for example, the modulation will be detectable. FIG. 2 is a graphical illustration of the condition in which both the carrier frequency and the upper sideband frequency fall within the IF bandwidth of a particular equipment.

Figure 3:
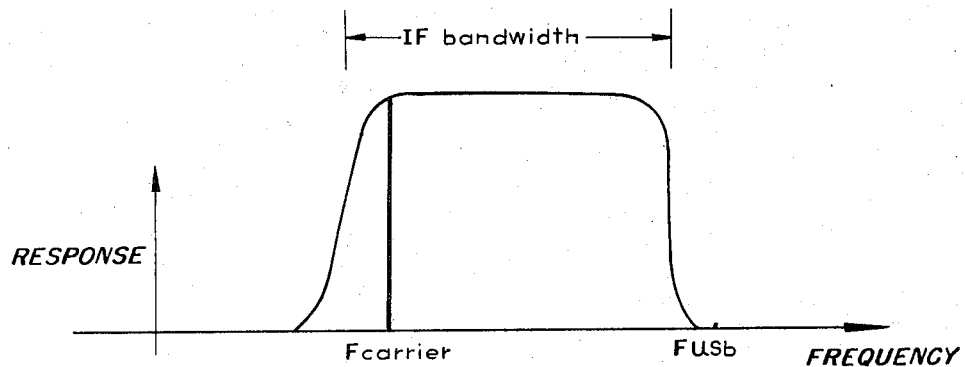
FIG. 3 is a graphical illustration of the conditions under which a carrier frequency signal and its upper sideband frequency signal may not be included within the IF bandwidth of a particular equipment.

It is equally true, however, that should the modulation frequency be increased to a degree where the carrier frequency and at least one sideband frequency are not both included within the bandpass of a particular equipment, one of such frequencies will be highly attenuated. This condition is illustrated in FIG. 3 wherein the carrier frequency falls within the IF bandwidth of an equipment, but the disposition of the upper sideband frequency is such that it falls outside the IF bandwidth of the equipment. Consequently, the upper sideband frequency signal is severely attenuated with the result that the equipment responds only to the continuous wave, i.e., a signal with no modulation. Accordingly, when only such a continuous wave is received by a detector, no output will be produced by the detector since no modulation is present.

The concept of the present invention employs, in part at least, these relationships in generating an automatic measure of the bandwidth of equipment under test.

Figure 4:
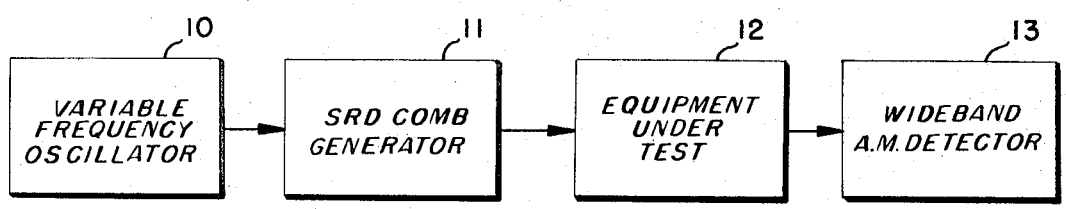
FIG. 4 is a schematic block diagram of an embodiment of the present invention.

FIG. 4 is a schematic block diagram illustrating a preferred embodiment of the present invention. A signal source for producing signals of selectively determinable variations in repetition frequency may take the form of a variable frequency oscillator 10 as illustrated in FIG. 4. A step-recovery diode circuit 11 is connected to receive the signals of the variable frequency oscillator 10 for generating output signals having spectral frequency distributions which vary as a function of the variations in the repetition frequency of the variable freqency oscillator 10. The step-recovery diode circuit 11 may be characterized as a "comb generator" to indicate that it produces harmonic frequency signals at multiples of a received fundamental frequency. The output of the step-recovery diode comb generator 11 is connected to the input of the equipment under test 12. The output of the equipment under test 12 is connected to a wide-band amplitude modulation detector 13.

Figure 5:
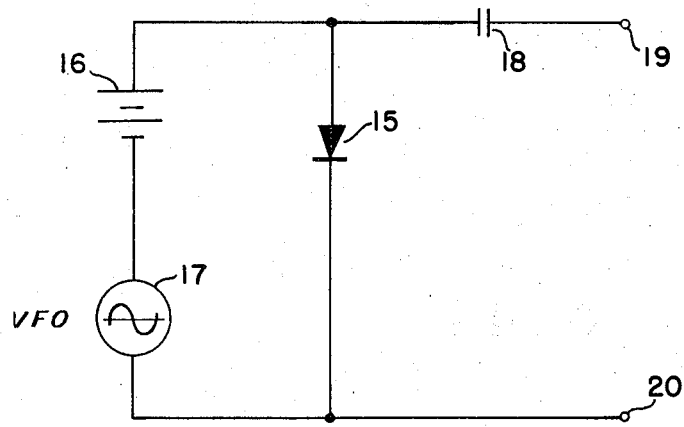
FIG. 5 is a schematic wiring diagram of a type of step-recovery diode comb generator circuit which may be employed in the present invention.

The step-recovery diode comb generator 11 may take the form of a circuit of the type illustrated in FIG. 5. In FIG. 5 a step-recovery diode 15 is connected across a source of electrical energy schematically indicated as a battery 16 together with a variable frequency oscillator 17. A capacitor 18 couples the output developed by the step-recovery diode 15 to an output which is generated across terminals 19 and 20. The type of circuit illustrated in FIG. 5 and its characteristic outputs are known in the art as disclosed, for example, in publications such as the Hewlett Packard Application Note 920, titled "Harmonic Generation Using Step-Recovery Diodes and SRD Modules."

In accordance with the concept of the present invention, an embodiment such as that illustrated in FIG. 4 is operated to selectively adjust the frequency of oscillations generated by the variable frequency oscillator 10 to produce a detected output at the wide-band amplitude modulation detector 13. The frequency of the signals generated by the variable frequency oscillator 10 is then gradually increased until the wide-band amplitude modulation detector 13 ceases to produce a detected output. The frequency produced by the variable frequency oscillator 10 at that point of adjustment is a direct indication of the bandwidth of the equipment under test 12 for the reasons previously explained in connection with the operative functions illustrated by FIGS. 2 and 3.

The nature of the operation of the step-recovery diode comb generator 11 is such that it produces a family or comb of harmonically related output signals each of which is separated from the other by a frequency difference equal to the fundamental frequency. The fundamental frequency is determined by the frequency of the input signals received by the step-recovery diode comb generator 11 from the variable frequency oscillator 10.

The step-recovery diode comb generator 11 is operative so that, as the frequency of the signals received from a variable frequency source such as the variable frequency oscillator 10 is increased, the frequency separation between harmonically related comb signals is commensurately increased.

That is to say that, for example, if initially the step-recovery diode comb generator 11 is driven by a signal having a frequency of 3KHz, each frequency separation between adjacent harmonically related comb frequencies at the output would be that of the fundamental frequency, i.e., a frequency separation of 3KHz.

When, however, the frequency of the driving signals fed to the step-recovery diode comb generator circuit 11 are increased from 3KHz to 5KHz, for example, each frequency separation between harmonically related comb signals generated by the step-recovery diode comb generator 11 is commensurate with that of the fundamental frequency as adjusted to 5KHz.

Further, for illustrative purposes, if the bandwidth of the equipment under test 12 is at least 5KHz, the wide band amplitude modulation detector 13 would respond to the previously described signals as if they were am-plitude modulation signals and produce a detected output. When the frequency of the driving signals fed to the step-recovery diode comb generator 11 continue to be increased, a point will be reached where no detected output will be generated by the wide band amplitude modulation detector 13. This is so because a condition has been created which is essentially analogous to that graphically illustrated in FIG. 3 wherein the carrier frequency is within the IF bandwidth of an equipment, but the upper sideband frequency is outside the IF bandwidth of a particular equipment. Accordingly, under the conditions described at the point of adjustment where an output ceases to be generated by the wide band amplitude modulation detector 13, the frequency of the source of signals driving the step-recovery diode comb generator 11, such as a variable frequency oscillator 10, will indicate the bandwidth response of the equipment under test 12.

Thus, the present invention provides a rapid, reliable, and simple means of directly indicating bandwidth response of an equipment selected to be tested.

Additionally, it should be noted that the concept of the present invention is such that any suitable source of variable frequency signals such as a variable frequency pulse generator, or any comparably operative circuit, may be employed with equal facility and highly desirable functional results.

Moreover, the wide band amplitude modulation detector 13 as illustrated in FIG. 4 may in certain instances be a part or portion of the equipment under test. For example, in an equipment such as an amplitude modulation receiver where the bandwidth of its IF portion is being tested, the multiple harmonically related comb signals developed by the step-recovery diode comb generator circuit 11 may be impressed at the input of the IF portion of the receiver under test, and the amplitude modulation detection portion of the receiver itself may be employed as the wide band amplitude modulation detector 13 shown in FIG. 4.

It will be obvious to those skilled and knowledgeable in the pertinent arts that the indication of a detected signal may take the form of an audio tone, for example, or be appropriately visually observed from a simple meter, lamp, oscilloscope, or other comparable indicator.

Additionally, as will be apparent from an understanding of the concept of the present invention and its most preferred implementation, it is readily adaptable to embodiment in a solid state, highly durable, compact, simple and reliable form.

Obviously many modifications and variations of the present invention are possible in the light of the above teachings. It is therefore to be understood that within the scope of the appended claims the invention may be practiced otherwise than as specifically described.

What is claimed is:

1. A bandwidth measurement system comprising:
a signal source for producing signals of selectively determinable variations in repetition frequency;
a step-recovery diode circuit connected to receive the signals of said source for generating signals having spectral frequency distributions varying as a function of said variations in repetition frequency;

means for connecting the signals generated by said step-recovery diode circuit to the input of a circuit under test; and
a wideband amplitude modulation detection means connected to the output of said circuit under test, whereby the highest pulse repetition frequency producing signals detectable by said detection means is a measure of the bandwidth of said circuit under test.

2. A bandwidth measurement system as claimed in claim 1 wherein said signal source is a pulse generator.

3. A bandwidth measurement system as claimed in claim 1 wherein said step-recovery diode generates a comb spectrum output.

4. A bandwidth measurement system as claimed in claim 3 wherein said comb spectrum output comprises spectral line spacing equal to said repetition frequency.

* * * * *